(12) United States Patent
Silva

(10) Patent No.: US 7,114,522 B2
(45) Date of Patent: Oct. 3, 2006

(54) ADAPTER MANIFOLD WITH DUAL VALVE BLOCK

(76) Inventor: David James Silva, 11081 Negley Ave., San Diego, CA (US) 92131

( * ) Notice: Subject to any disclaimer, the term of this patent is extended or adjusted under 35 U.S.C. 154(b) by 21 days.

(21) Appl. No.: 10/944,364

(22) Filed: Sep. 18, 2004

(65) Prior Publication Data

US 2006/0060254 A1 Mar. 23, 2006

(51) Int. Cl.
*F16K 7/17* (2006.01)
(52) U.S. Cl. ...................... 137/597; 251/61.1
(58) Field of Classification Search ........... 137/597, 137/883, 884, 885; 251/61.1
See application file for complete search history.

(56) References Cited

U.S. PATENT DOCUMENTS

| | | | | |
|---|---|---|---|---|
| 5,542,444 | A * | 8/1996 | Alcock | 137/1 |
| 5,657,786 | A * | 8/1997 | DuRoss et al. | 137/15.01 |
| 5,743,295 | A * | 4/1998 | Alcock et al. | 137/519 |
| 6,012,479 | A * | 1/2000 | Fukushima et al. | 137/271 |
| 6,123,340 | A * | 9/2000 | Sprafka et al. | 277/608 |
| 6,234,203 | B1 * | 5/2001 | Backlund | 137/597 |
| 6,250,332 | B1 * | 6/2001 | Backlund | 137/597 |
| 6,431,229 | B1 | 8/2002 | Birtcher et al. | |

OTHER PUBLICATIONS

Swagelok Company, High-Flow, Springess Diaphragm Valves, Catalog, May 2003, "Features" Figure of p. 2 and "Flow Path" Figure of p. 6.

* cited by examiner

*Primary Examiner*—John Fox
(74) *Attorney, Agent, or Firm*—Serafini Associates; Franco A. Serafini

(57) ABSTRACT

An adapter manifold comprising a first dual valve block having a first diaphragm valve and a second diaphragm valve; a first, a second, and a third low dead space connector for connecting the adapter manifold with dual valve block to the remaining portions of the chemical delivery system; a first conduit for connecting both the diaphragm side of the first diaphragm valve and the seat side of the second diaphragm valves to the first low dead space connector; a second conduit for connecting the seat side of the first diaphragm valve to the second low dead space connector; and a third conduit for connecting the diaphragm side of the second diaphragm valve to the third low dead space connector.

7 Claims, 2 Drawing Sheets

ADAPTER MANIFOLD WITH DUAL VALVE BLOCK

STATEMENT REGARDING FEDERALLY SPONSORED RESEARCH AND DEVELOPMENT

Not applicable.

REFERENCE TO A COMPUTER LISTING, A TABLE, OR A COMPUTER PROGRAM LISTING COMPACT DISK APPENDIX

Not applicable.

BACKGROUND OF THE INVENTION

1. Field of the Invention

The present invention concerns an adapter manifold with dual valve block, and, more specifically, an adapter manifold for the delivery of high purity chemicals having a dual valve block with conduits free of dead pockets.

2. Description of Related Art

Certain manufacturing processes require the delivery of chemicals at high purity levels.

For example, in the semiconductor industry, certain low vapor pressure chemicals, such as tetrakis(dymethilamino) titanium (TDMAT), tetrakis(diethylamino) titanium (TDEAT), tantalum pentaethoxide (TAETO), copper hexafluoroacetylacetonate-trimethylvinylsilane (Cu(hfac)T-MVS), tetramethyltetracyclosiloxane (TMCTS), tetraethyl ortosilicate (TEOS), and trimethylphosphate (TMP), are utilized to manufacture semiconductors by a chemical vapor deposition process, which may be in the form of a direct liquid injection (DLI) or of a "bubbler" process.

During the fabrication process, the chemical is stored at a 99.99+% purity level in a first container that has a capacity varying from 100 milliliters to 200 liters and that is known in the art by a variety of common and trade names such as "canister," "ampoule," or "host." From the first container, the chemical is distributed to a second container or to a process tool by a system of manifolds while maintaining the high purity level.

From time to time, it is necessary to replace and clean the first or second containers, for instance, due to maintenance requirements, or to the decomposition of the chemical stored in the container, or for other reasons. Before detaching the container from the manifolds, any remaining chemical must be purged out of the manifolds connected to the container. Typically, the chemical is purged by means of a multi-step process comprising a sequence of blow cycles and of vacuum cycles. Because of the high level of decontamination required, and because some liquid chemical may remain trapped within any dead spaces in the manifolds, this procedure is extremely time consuming, with a consequent negative effect on process yields.

It is desirable to consolidate the valves in the manifolds of these delivery systems into a single valve block, in order in order to minimize the lengths of the connecting tubes, thereby reducing potential areas of entrapment or adhesion of the low vapor pressure chemical. It is also desirable to provide for more compact manifolds, in order to reduce the space requirements of the cabinets where these manifolds and containers are generally located.

U.S. Pat. No. 6,431,229 B1 to Birtcher et al. discloses a purgeable adapter manifold for low vapor pressure chemicals that includes a dual valve block. As shown in FIG. 1, the dual valve block 10 according to the Birtcher invention comprises a first diaphragm valve 12 and a second diaphragm valve 14, having orifices in the seats of the two diaphragm valves that are juxtaposed and connected by a first conduit 16.

A second conduit 18 connects first conduit 16 to the container, therefore connecting the seat sides of both diaphragm valves to the container, while a third conduit 20 connects first conduit 16 to a process tool or to a second container. During ordinary process conditions, both diaphragm valves are in an open condition, enabling the low vapor pressure chemical to flow from second conduit 18 into first conduit 16 and into third conduit 20 and to be delivered to a process tool or to an intermediary container.

During the purge cycle, as a first step, purge gas is blown in a direction opposite to ordinary process conditions flowing from third conduit 20 into second conduit 18. As a second step, second diaphragm valve 14 is closed, and the purge gas flows from third conduit 20 into a fourth conduit 24 and then to a source of vent. As a third step, first diaphragm valve 12 and second diaphragm valve 14 are in a closed condition, and a vacuum purge is performed by applying vacuum at third conduit 20, in order to remove remaining traces of the low vapor pressure chemical.

It will be appreciated that, during the second step of the gas purge, there is no gas flow through a portion of first conduit 16, more specifically, the portion delimited by third conduit 20 at one end and by orifice 26 in the seat of second diaphragm valve 14 at the other end. Therefore, that portion of first conduit 16 constitutes a dead pocket, from which any chemical remaining after the second step of the purge can be removed only by means of a Venturi effect, whereby a pressure differential causes the residual chemical to be drawn from the dead pocket into the stream of the purge gas. In order to accomplish chemical removal through such Venturi effect, however, sufficient time must be allowed for the residual chemical to be drawn out of the dead pocket, causing the purge cycle to be extended. Further, the vacuum purge in the third step must always be performed, to insure that any residual chemical in the dead pocket, not displaced by the Venturi effect, is removed. The length of the vacuum cycle depends on the amount of remaining chemical and on the desired cleanliness level, and requires pumps of adequate capacity with stainless steel components, due to the corrosive properties of the chemical.

Therefore, there is a need for an adapter manifold having a dual valve block that comprises no dead pocket in its conduit system.

BRIEF SUMMARY OF THE INVENTION

The present invention teaches an adapter manifold for the delivery of high purity chemicals having a dual valve block with no dead pockets in its conduit system.

In one embodiment, the adapter manifold according to the present invention comprises a dual valve block having a first diaphragm valve and a second diaphragm valve; a first, second, and third low dead space connectors connecting the dual valve block to the remaining portion of the chemical delivery system; a first conduit connecting both the diaphragm side of the first diaphragm valve and the seat side of the second diaphragm valves to the first low dead space connector; a second conduit connecting the seat side of the first diaphragm valve to the second low dead space connector; and a third conduit connecting the diaphragm side of the second diaphragm valve to the third low dead space connector.

It is an advantage of the present invention to shorten the purge cycle of a high purity chemical delivery system.

It is a further advantage of the present invention to provide a more compact delivery system for high purity chemicals.

It is a still further advantage of the present invention to reduce capital outlays in high purity chemical delivery systems with predetermined purity levels.

These and other advantages of the present invention will become apparent from a reading of the following description, and may be realized by means of the instrumentalities and combinations particularly pointed out in the appended claims.

BRIEF DESCRIPTION OF THE SEVERAL VIEWS OF THE DRAWINGS

The drawings constitute a part of this specification and include an exemplary embodiment of the invention, which may be embodied in various forms. It is to be understood that in some instances various aspects of the invention may be shown exaggerated or enlarged to facilitate an understanding of the invention.

DETAILED DESCRIPTION OF THE INVENTION

A detailed description of embodiments of the invention is provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 2:
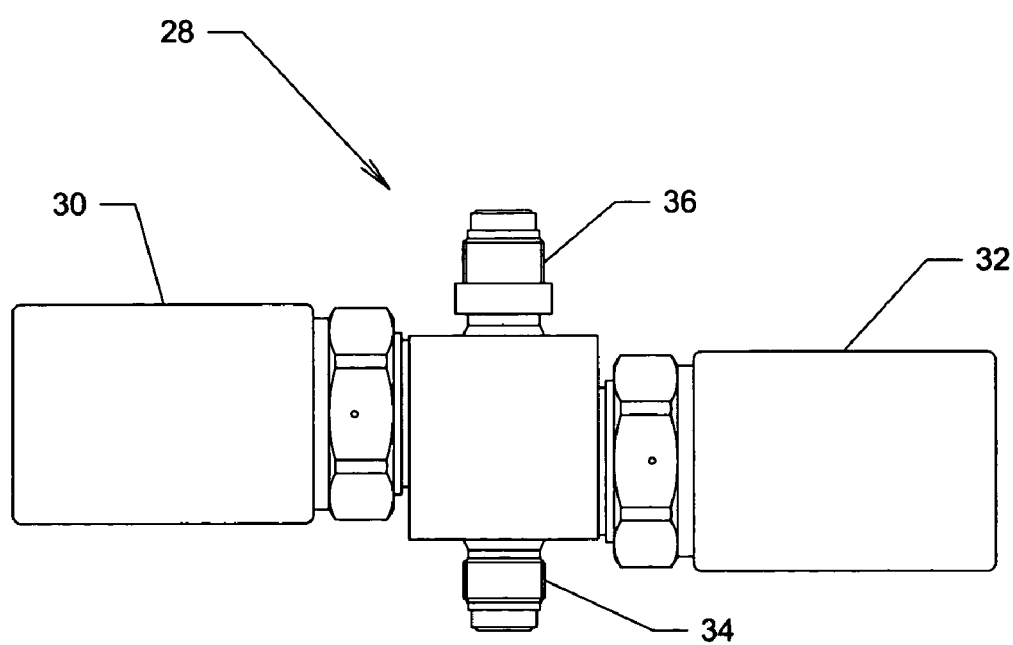
FIG. 2 is a front view of an adapter manifold with a dual valve block according to one embodiment of the present invention.

Turning now to FIG. 2, there is shown a first embodiment of the present invention. An adapter manifold 28 comprises a dual valve block having a first diaphragm valve 30 and a second diaphragm valve 32, each of the diaphragm valves having a seat side and a diaphragm side. A "seat side" is defined as that portion of the valve chamber that is situated in a central position and is substantially coaxial with the valve diaphragm while a "diaphragm side" is defined as that portion of the valve chamber that is peripherally in relation to the seat side. A first low dead space connector 34 detachably connects adapter manifold with dual valve block 28 to a first container storing the high purity chemical, while a second low dead space connector 36 detachably connects adapter manifold with dual valve block 28 to a process tool or to a second container during ordinary process conditions, and to a source of purge gas or to a source of vacuum during the purge cycle. Instead, a third low dead space connector (not shown) detachably connects adapter manifold with dual valve block 28 to a source of vent or to a source of vacuum during the purge cycle. A plurality of conduits connects the two diaphragm valves to each other and to the low dead space connectors as described in the following paragraphs.

Examples of low dead space connectors include fittings of the standard VCR type and low obstruction fittings such as Fujikin's UPG gasket fittings or Hy-Tech's Full Bore 002 fittings.

Figure 3:
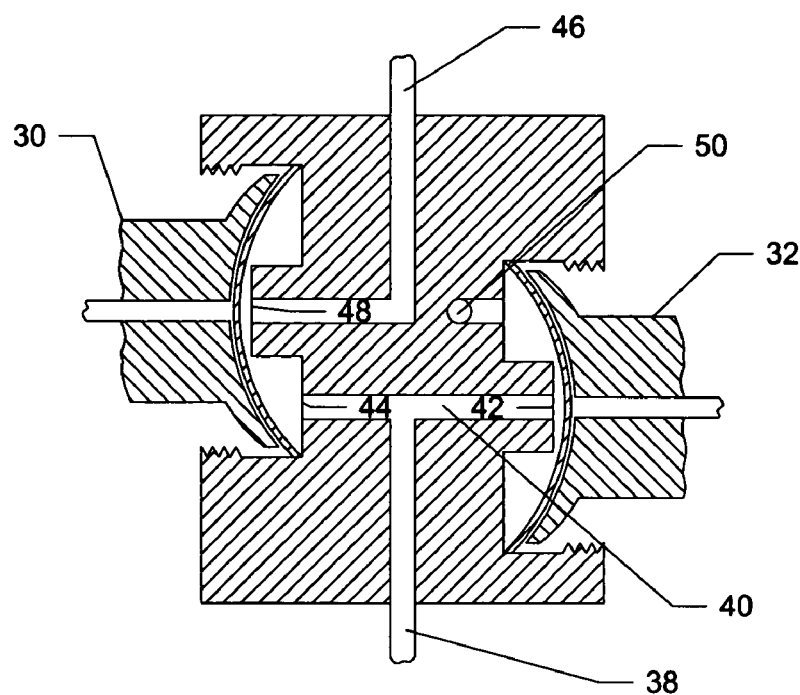
FIG. 3 is a cross-sectional view of a portion of the adapter manifold with dual valve block of FIG. 2.

Turning now to FIG. 3, there is shown a cross section of the central portion of the dual valve block. A first conduit 38 connects first low dead space connector 34 to an intermediary conduit 40, which in turn connects a first orifice, or port, 42 on the seat side of second diaphragm valve 32 to a second orifice, or port, 44 on the diaphragm side of first diaphragm valve 30. First port 42 and second port 44 are juxtaposed to, and in direct communication with, each other. As shown in FIG. 3, when either diaphragm valve is in a closed condition, flow of fluid through the dual valve block is prevented.

Further, a second conduit 46 connects second low dead space connector 36 to a third orifice 48 on the seat side of first diaphragm 30, and a third conduit 50 connects the third low dead space connector to a fourth orifice 52 on the diaphragm side of second diaphragm valve 32.

The diaphragms of first diaphragm valve 30 and second diaphragm valve 32 are typically disks having each a convex side and a concave side, the concave side being oriented in the direction of the valve seat. These diaphragms are typically made of a flexible material, such as a flexible metal. Further, first diaphragm valve 30 and second diaphragm valve 32 may each be actuated manually, pneumatically, or electrically with a solenoid, the actuator being connected to the diaphragm of each valve.

First low dead space connector 34, second low dead space connector 36, and the third low dead space connector may each be of different designs. For instance, all of the low dead space connectors may be of a standard VCR type, or the first low dead space connector may be of a standard VCR design, while the second or third low dead space connector may be of a low obstruction design.

Figure 4:
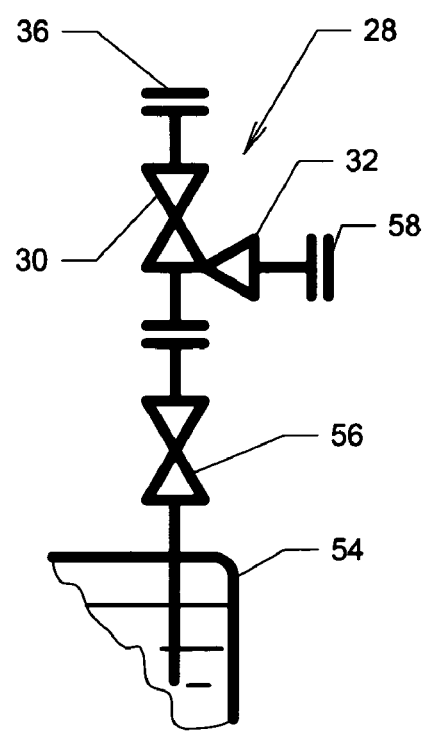
FIG. 4 is a schematic diagram of a portion of a high purity chemical delivery system comprising the present invention.

The operation and advantages of adapter manifold with dual valve block 28 may be better understood upon reference to FIG. 4. During ordinary process conditions, the high purity chemical is delivered from a first container 54 to a process tool or to a second container, exiting container 54 through a container isolation valve 56, which enables or prevents flow communication between container 54 and the rest of the high purity chemical delivery system. Because container isolation valves are known in the art, container isolation valve 56 will not be described in detail here.

The high purity chemical successively flows through adapter manifold with dual valve block 28, entering adapter manifold with dual valve block 28 through first low dead space connector 34 and exiting through second low dead space connector 36. Therefore, the chemical flows through first diaphragm valve 30, which is in an open condition, but not through second diaphragm valve 32, which remains in a closed condition.

During the first step of the purge cycle, first diaphragm valve 30 and adapter valve 56 are in an open condition and second diaphragm valve 32 is in a closed condition. Purge gas is blown through second low dead space connector 36 into container 54, purging second conduit 46, a portion of intermediate conduit 40, and first conduit 38.

During the second step of the purge cycle, container isolation valve 56 is closed and second diaphragm valve 32 is opened. Purge gas is then blown through second low dead space connector 36 to a source of vent connected to the third low dead space connector, numbered 58 in FIG. 4. Optionally, vacuum may be applied at third low dead space connector 58, in order to increase the flow of the purge gas through adapter manifold with dual valve block 28.

During the third step of the purge cycle, first diaphragm valve 30 and second diaphragm valve 32 are in a closed condition, and vacuum is be applied at second low dead space connector 36, removing any residual chemical from adapter manifold with dual valve block 28, or, under less restrictive purity conditions, simply enabling verification that all chemical has been removed from the seat side of first diaphragm valve 30.

Because all dead pockets have been eliminated from the conduits, the dual valve block of the present invention provides for more efficient and shorter purge cycles than in the prior art. Further, the vacuum cycle may be omitted other than for verifying that all chemical has been removed, providing for a purge cycle with essentially only two steps, which is shorter and, therefore, more economical. If the vacuum cycle is eliminated, a more compact and less expensive vacuum pump may be employed for the purpose of verifying chemical removal, with a reduced capacity and a less expensive construction than in the prior art.

Other embodiments of the present invention comprise adapter manifolds for high purity chemical delivery systems with different types of dual valve blocks, including dual valve blocks known in the prior art.

Figure 1:
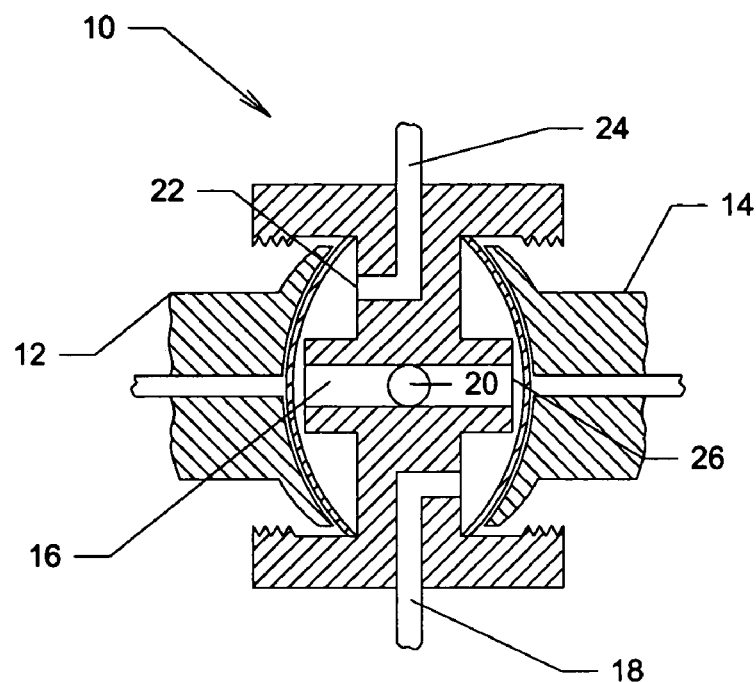
FIG. 1 is a cross-sectional view of a portion of an adapter manifold with a dual valve block according to the prior art.

For instance, a second embodiment of the present invention comprises an adapter manifold for high purity chemical delivery systems with the dual valve block illustrated in FIG. 1. More specifically, the second embodiment comprises an adapter manifold having a dual valve block with a first diaphragm valve and a second diaphragm valve, wherein a first conduit connects the seat sides of the two diaphragm valves, a second conduit connects the diaphragm side of the second diaphragm valve to a first low dead space connector, a third conduit connects the first conduit to the second low dead space connector, and a fourth conduit connects the diaphragm side of the first diaphragm valve to the third low dead space connector. Within a semiconductor manufacturing facility, the first low dead space connector detachably connects the adapter manifold with dual valve block to a container of high purity chemicals, the second low dead space connector detachably connects the adapter manifold with dual valve block to a process tool or to a second container, and the third low dead space connector detachably connects the adapter manifold with dual valve block to a source of vent.

While the invention has been described in connection with the above described embodiments, it is not intended to limit the scope of the invention to the particular forms set forth, but on the contrary, it is intended to cover such alternatives, modifications, and equivalents as may be included within the scope of the invention.

The invention claimed is:

1. A dual valve block comprising:
   a first diaphragm valve and a second diaphragm valve, each diaphragm valve having a diaphragm and a chamber, the chamber comprising a seat port substantially coaxial with the diaphragm and a diaphragm port in a peripheral position in relation to the seat port;
   a first conduit for connecting the diaphragm port of the first diaphragm valve and the seat port of the second diaphragm valve to a first connector;
   a second conduit for connecting the seat port of the first diaphragm valve to a second connector; and
   a third conduit for connecting the diaphragm port of the second diaphragm valve to a third connector,
   wherein the diaphragm port of the of the first diaphragm valve is juxtaposed to and in direct flow communication with the seat port of the second diaphragm valve, and
   wherein flow through the dual valve block is prevented when either of the first or the second diaphragm valves is in a closed condition.

2. The dual valve block of claim 1, wherein the first and second diaphragm valves have each a valve actuator engaged to the diaphragm of each valve, the actuator being suitable for causing the valve to be in an open and in the closed condition.

3. An adapter manifold with dual valve block comprising:
   a dual valve block comprising a first diaphragm valve and a second diaphragm valve, each diaphragm valve having a diaphragm and a chamber, the chamber comprising a seat port substantially coaxial with the diaphragm and a diaphragm port in a peripheral position in relation to the seat port;
   a first low dead space connector for detachably connecting the dual valve block to a first source, wherein the first source is a container for storing a high purity chemical;
   a second low dead space connector for detachably connecting the dual valve block to a second source, wherein the second source is a process tool, a second container for storing the high purity chemical, a source of gas, or a source of vacuum; and
   a third low dead space connector for detachably connecting the dual valve block to a third source, wherein the third source is a source of vent, or a source of vacuum,
   wherein the dual valve block further comprises,
      a first conduit for connecting the diaphragm side of the first diaphragm valve and the seat side of the second diaphragm valve to the first low dead space connector,
      a second conduit for connecting the seat side of the first diaphragm valve to the second low dead space connector, and
      a third conduit for connecting the diaphragm side of the second diaphragm valve to the third low dead space connectors,
   wherein the diaphragm side of the of the first diaphragm valve is juxtaposed to and in direct flow communication with the seat side of the second diaphragm valve, and
   wherein flow through the dual valve block is prevented when either of the first or the second diaphragm valves is in a closed condition.

4. The adapter manifold with dual valve block of claim 3, wherein the first low dead space connector is of the standard VCR type.

5. The adapter manifold with dual valve block of claim 3, wherein the second low dead space connector is a low obstruction fitting.

6. The adapter manifold with dual valve block of claim 3, wherein the third low dead space connector is a low obstruction fitting.

7. The adapter manifold with dual valve block of claim 3, wherein the first, the second, and the third low dead space connectors are of the standard VCR type.

* * * * *